US012795477B2

(12) United States Patent
Lee et al.

(10) Patent No.: US 12,795,477 B2
(45) Date of Patent: Nov. 10, 2026

(54) METHOD AND APPARATUS FOR REPORTING STATIONARY STATE IN WIRELESS COMMUNICATION SYSTEM

(71) Applicant: LG Electronics Inc., Seoul (KR)

(72) Inventors: Oanyong Lee, Seoul (KR); Sunghoon Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 305 days.

(21) Appl. No.: 18/569,945

(22) PCT Filed: Mar. 7, 2022

(86) PCT No.: PCT/KR2022/003193
§ 371 (c)(1),
(2) Date: Dec. 13, 2023

(87) PCT Pub. No.: WO2023/008674
PCT Pub. Date: Feb. 2, 2023

(65) Prior Publication Data
US 2024/0388984 A1 Nov. 21, 2024

(30) Foreign Application Priority Data
Jul. 26, 2021 (KR) ........................ 10-2021-0097996

(51) Int. Cl.
*H04W 36/00* (2009.01)
*H04W 24/10* (2009.01)

(52) U.S. Cl.
CPC ....... *H04W 36/0085* (2018.08); *H04W 24/10* (2013.01); *H04W 36/0058* (2018.08)

(58) Field of Classification Search
CPC ............. H04W 36/0085; H04W 24/10; H04W 36/0058
See application file for complete search history.

(56) References Cited

U.S. PATENT DOCUMENTS

2016/0044541 A1 2/2016 Lunden et al.
2017/0150384 A1 5/2017 Rune et al.
(Continued)

FOREIGN PATENT DOCUMENTS

WO WO 2020/249199 A1 12/2020

OTHER PUBLICATIONS

Ericsson, "Triggering conditions for Rel-17 RRM relaxation," 3GPP TSG-RAN WG2 #114e Tdoc, R2-2105246, Electronic meeting, May 19-27, 2021, 4 pages.
(Continued)

*Primary Examiner* — Jackie Zuniga Abad
(74) *Attorney, Agent, or Firm* — Fish & Richardson P.C.

(57) ABSTRACT

A method performed by a user equipment (UE) in a wireless communication system comprises: receiving, from a serving cell, a measurement configuration comprising i) a cell quality condition for a measurement report, and ii) at least one stationarity condition for the measurement report; performing a measurement on one or more cells based on the measurement configuration, to obtain a measurement result for the one or more cells; and transmitting, to the serving cell, the measurement report based on that i) the measurement result for the one or more cells satisfies the cell quality condition, and ii) the at least one stationarity condition is satisfied for the UE. The measurement report comprises the measurement result for the one or more cells, and stationarity information informing that the at least one stationarity condition is satisfied for the UE.

11 Claims, 13 Drawing Sheets

(56) References Cited

U.S. PATENT DOCUMENTS

| | | | | |
|---|---|---|---|---|
| 2021/0105647 | A1 | 4/2021 | Lee | |
| 2021/0105649 | A1* | 4/2021 | Lee | H04W 24/10 |
| 2022/0232471 | A1* | 7/2022 | Laselva | H04W 24/08 |
| 2022/0368403 | A1* | 11/2022 | Tang | H04W 52/143 |

OTHER PUBLICATIONS

International Search Report and Written Opinion in Appln. No. PCT/KR2022/003193, mailed on Jun. 14, 2022, 3 pages.

LG Electronics Inc., “RRM relaxation for stationary RedCap Ues,” 3GPP TSG-RAN WG2 Meeting #114-e, R2-2105788, Online, May 19-27, 2021, 3 pages.

Oppo et al., “Discussion on RRM relax for RedCap Ues,” 3GPP TSG-RAN WG2 Meeting #114 electronic, R2-2104811, Online, May 19 -27, 2021, 5 pages.

CMCC, “Discussion on RLM/BFD relaxation for NR power saving enhancement,” R4-2104605, 3GPP TSG-RAN WG4, Meeting #98bis-e, Electronic Meeting, Apr. 12-20, 2021, 7 pages.

Extended European Search Report in European Appln. No. 22849654.3, mailed on Oct. 28, 2024, 12 pages.

Vivo, “Summary #5 of UE power Consumption Reduction in RRM Measurements,” R1-1903805, 3GPP TSG RAN WG1, Meeting #96, Athens, Greece, Feb. 25-Mar. 1, 2019, 59 pages.

* cited by examiner

METHOD AND APPARATUS FOR REPORTING STATIONARY STATE IN WIRELESS COMMUNICATION SYSTEM

CROSS-REFERENCE TO RELATED APPLICATIONS

This application is a National Stage application under 35 U.S.C. § 371 of International Application No. PCT/KR2022/003193, filed on Mar. 7, 2022, which claims the benefit of Korean Patent Application No. 10-2021-0097996, filed on Jul. 26, 2021. The disclosures of the prior applications are incorporated by reference in their entirety.

TECHNICAL FIELD

The present disclosure relates to reporting a stationary state of a user equipment (UE) in wireless communications.

BACKGROUND ART

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

A UE may be in a stationary state when a mobility of the LIE is almost stationary. The UE may report the stationary state to a network, and the network can handle the stationary UE based on the reported information.

SUMMARY

An aspect of the present disclosure is to provide method and apparatus for reporting a stationary state of a UE in a wireless communication system.

Another aspect of the present disclosure is to provide method and apparatus for handling a stationary UE in a wireless communication system.

According to an embodiment of the present disclosure, a method performed by a user equipment (UE) in a wireless communication system comprises: receiving, from a serving cell, a measurement configuration comprising i) a cell quality condition for a measurement report, and ii) at least one stationarity condition for the measurement report; performing a measurement on one or more cells based on the measurement configuration, to obtain a measurement result for the one or more cells; and transmitting, to the serving cell, the measurement report based on that i) the measurement result for the one or more cells satisfies the cell quality condition, and ii) the at least one stationarity condition is satisfied for the UE. The measurement report comprises the measurement result for the one or more cells, and stationarity information informing that the at least one stationarity condition is satisfied for the UE.

According to an embodiment of the present disclosure, a user equipment (UE) configured to operate in a wireless communication system comprises: at least one transceiver; at least processor; and at least one computer memory operably connectable to the at least one processor and storing instructions that, based on being executed by the at least one processor, perform operations comprising: receiving, from a serving cell, a measurement configuration comprising i) a cell quality condition for a measurement report, and ii) at least one stationarity condition for the measurement report; performing a measurement on one or more cells based on the measurement configuration, to obtain a measurement result for the one or more cells; and transmitting, to the serving cell, the measurement report based on that i) the measurement result for the one or more cells satisfies the cell quality condition, and ii) the at least one stationarity condition is satisfied for the UE. The measurement report comprises the measurement result for the one or more cells, and stationarity information informing that the at least one stationarity condition is satisfied for the UE.

According to an embodiment of the present disclosure, at least one computer readable medium (CRM) stores instructions that, based on being executed by at least one processor, perform operations comprising: receiving, from a serving cell, a measurement configuration comprising i) a cell quality condition for a measurement report, and ii) at least one stationarity condition for the measurement report; performing a measurement on one or more cells based on the measurement configuration, to obtain a measurement result for the one or more cells; and transmitting, to the serving cell, the measurement report based on that i) the measurement result for the one or more cells satisfies the cell quality condition, and ii) the at least one stationarity condition is satisfied for the UE. The measurement report comprises the measurement result for the one or more cells, and stationarity information informing that the at least one stationarity condition is satisfied for the UE.

According to an embodiment of the present disclosure, an apparatus for configured to operate in a wireless communication system comprises: at least processor; and at least one computer memory operably connectable to the at least one processor. The at least one processor is configured to perform operations comprising: receiving, from a serving cell, a measurement configuration comprising i) a cell quality condition for a measurement report, and ii) at least one stationarity condition for the measurement report; performing a measurement on one or more cells based on the measurement configuration, to obtain a measurement result for the one or more cells; and transmitting, to the serving cell, the measurement report based on that i) the measurement result for the one or more cells satisfies the cell quality condition, and ii) the at least one stationarity condition is satisfied for the UE. The measurement report comprises the measurement result for the one or more cells, and stationarity information informing that the at least one stationarity condition is satisfied for the UE.

According to an embodiment of the present disclosure, a method performed by a base station (BS) configured to operate in a wireless communication system comprises: transmitting, to a user equipment (UE), a measurement configuration comprising i) a cell quality condition for a measurement report, and ii) at least one stationarity condition for the measurement report; receiving, from the UE, the measurement report comprising a measurement result for one or more cells, and stationarity information informing that the stationarity condition is satisfied for the UE; determining to enable the UE to perform a relaxed measurement based on the stationarity information; identifying, among the one or more cells, at least one first cell whose cell quality is worse than a threshold and at least one second cell whose cell quality is better than the threshold; and transmitting, to the UE, a configuration for enabling the UE to perform the relaxed measurement on the at least one first cell.

According to an embodiment of the present disclosure, a base station (BS) configured to operate in a wireless communication system comprises: at least one transceiver; at least processor; and at least one computer memory operably connectable to the at least one processor and storing instructions that, based on being executed by the at least one processor, perform operations comprising: transmitting, to a user equipment (UE), a measurement configuration comprising i) a cell quality condition for a measurement report, and ii) at least one stationarity condition for the measurement report; receiving, from the UE, the measurement report comprising a measurement result for one or more cells, and stationarity information informing that the stationarity condition is satisfied for the UE; determining to enable the UE to perform a relaxed measurement based on the stationarity information; identifying, among the one or more cells, at least one first cell whose cell quality is worse than a threshold and at least one second cell whose cell quality is better than the threshold; and transmitting, to the UE, a configuration for enabling the UE to perform the relaxed measurement on the at least one first cell.

The present disclosure can have various advantageous effects.

For example, the UE may be enabled by the network to perform a relaxed measurement after informing to the network that the UE is in a stationary state, and to perform the relaxed measurement on cells with not good cell quality determined by the measurement report from the UE. Therefore, the UE can save power and power consumption by the UE can be reduced.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DETAILED DESCRIPTION

Figure 1:
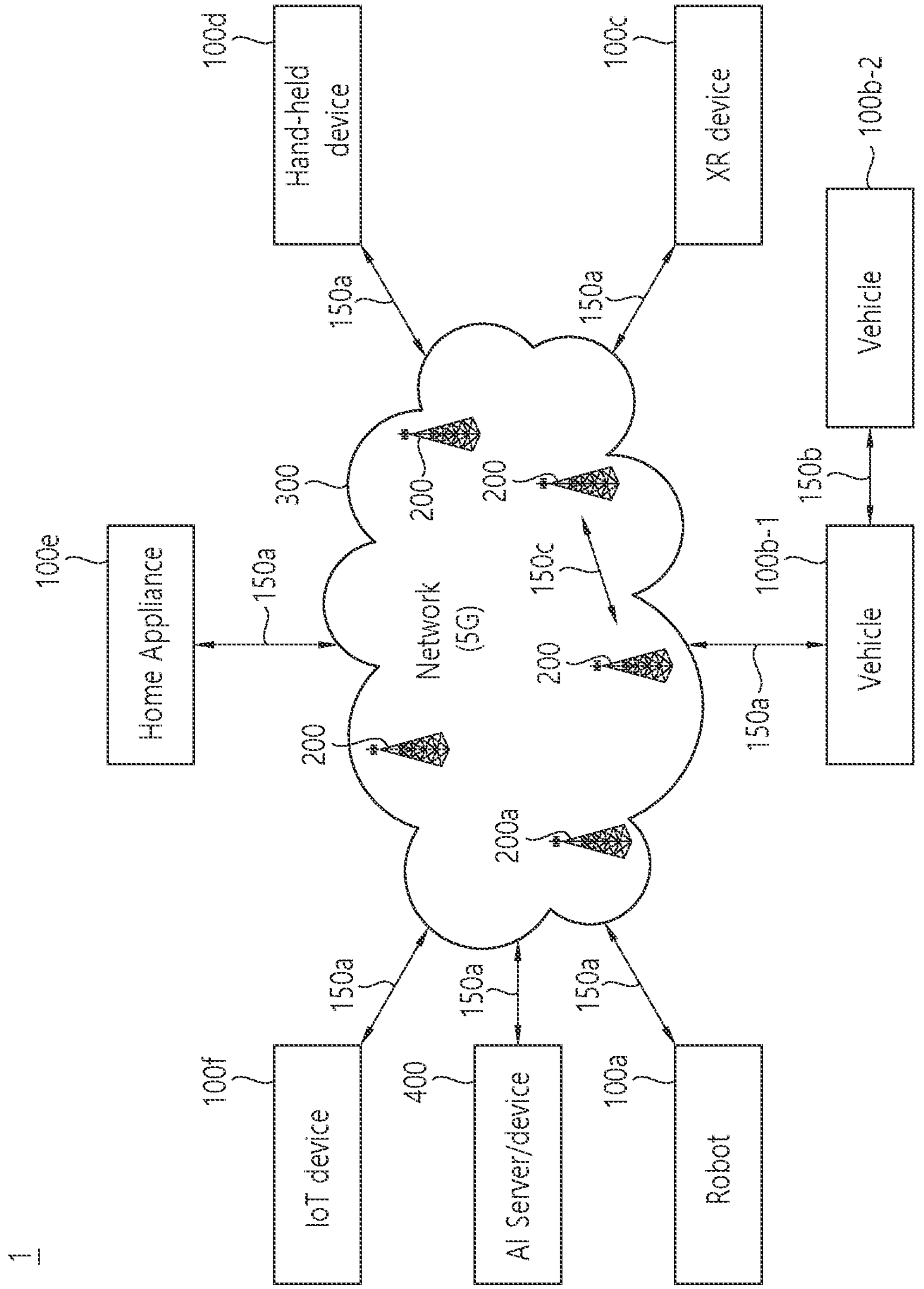
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data. rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as “A and/or B”. For example, “A, B or C” in the present disclosure may mean “only A”, “only B”, “only C”, or “any combination of A, B and C”.

In the present disclosure, slash (/) or comma (,) may mean “mid/or”. For example, “A/B” may mean “A and/or B”. Accordingly, “A/B” may mean “only A”, “only B”, or “both A and B”. For example, “A, B, C” may mean “A, B or C”.

In the present disclosure, “at least one of A and B” may mean “only A”, “only B” or “both A and B”. In addition, the expression “at least one of A or B” or “at least one of A and/or B” in the present disclosure may be interpreted as same as “at least one of A and B”.

In addition, in the present disclosure, “at least one of A, B and C” may mean “only A”, “only B”, “only C”, or “any combination of A, B and C”. In addition, “at least one of A, B or C” or “at least one of A, B and/or C” may mean “at least one of A, B and C”.

Also, parentheses used in the present disclosure may mean “for example”. In detail, when it is shown as “control information (PDCCH)”, “PDCCH” may be proposed as an example of “control information”. In other words, “control information” in the present disclosure is not limited to “PDCCH”, and “PDCCH” may be proposed as an example of “control information”. In addition, even when shown as “control information (i.e., PDCCH)”, “PDCCH” may be proposed as an example of “control information”.

Technical features that are separately described in one drawing in the present disclosure may be implemented separately or simultaneously.

Throughout the disclosure, the terms ‘radio access network (RAN) node’, ‘base station’, ‘eNB’, ‘gNB’ and ‘cell’ may be used interchangeably. Further, a UE may be a kind of a wireless device, and throughout the disclosure, the terms ‘UE’ and ‘wireless device’ may be used interchangeably.

Throughout the disclosure, the terms ‘cell quality’, ‘signal strength’, ‘signal quality’, ‘channel state’, ‘channel quality’, ‘channel state/reference signal received power (RSRP)’ and ‘reference signal received quality (RSRQ)’ may be used interchangeably.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to he a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to he established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100*a* to 100*f*, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100*a* to 100*f* represent devices performing communication using radio access technology (RAT) (e.g., 5G new RAT (NR)) or LTE) and may be referred to as communication/radio/5G devices. The wireless devices 100*a* to 100*f* may include, without being limited to, a robot 100*a*, vehicles 100*b*-1 and 100*b*-2, an extended reality (XR) device 100*c*, a hand-held device 100*d*, a home appliance 100*e*, an IoT device 100*f*, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100*a* to 100*f* may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, a 5G (e.g., NR) network, and a beyond-5G network. Although the wireless devices 100*a* to 100*f* may communicate with each other through the BSs 200/network 300, the wireless devices 100*a* to 100*f* may perform direct communication (e.g., sidelink communication) with each other without passing through the BSs 200/network 300. For example, the vehicles 100*b*-1 and 100*b*-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b* and 150*c* may be established between the wireless devices 100*a* to 100*f* and/or between wireless device 100*a* to 100*f* and BS 200 and/or between BSs 200. Herein, the wireless communication/connections may be established through various RATs (e.g., 5G NR) such as uplink/downlink communication 150*a*, sidelink communication (or device-to-device (D2D) communication) 150*b*, inter-base station communication 150*c* (e.g., relay, integrated access and backhaul (IAB)), etc. The wireless devices 100*a* to 100*f* and the BSs 200/the wireless devices 100*a* to 100*f* may transmit/receive radio signals to/from each other through the wireless communication/connections 150*a*, 150*b* and 150*c*. For example, the wireless communication/connections 150*a*, 150*b* and 150*c* may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

Figure 2:
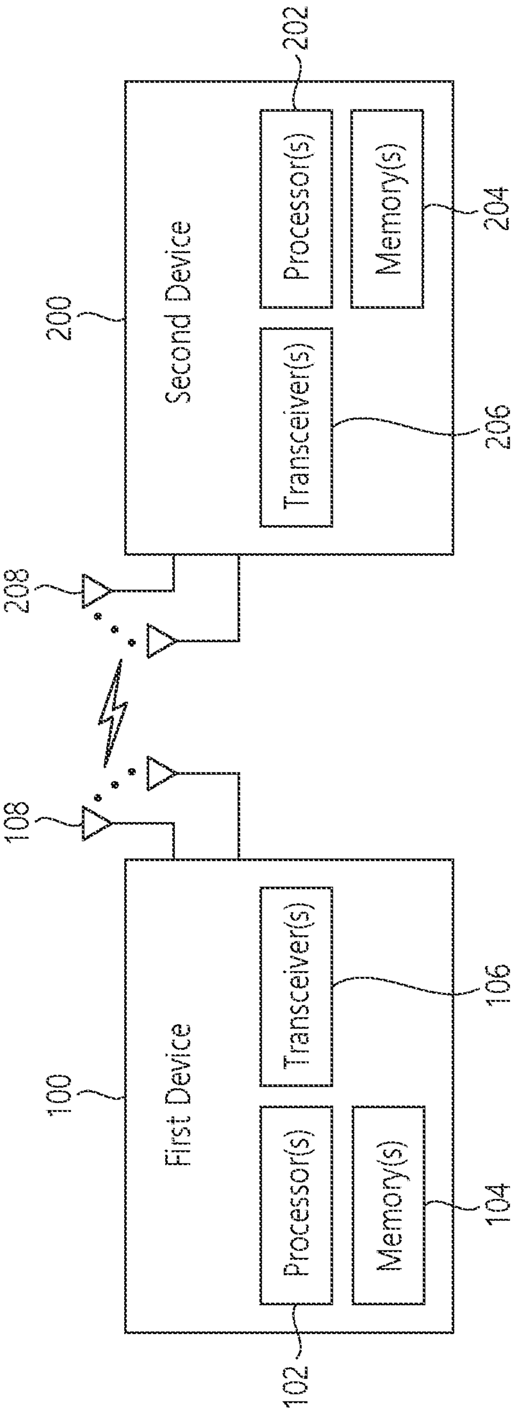
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs LTE and NR). In FIG. 2, {the first wireless device 100 and the second wireless device 200} may correspond to at least one of {the wireless device 100*a* to 100*f* and the BS 200}, {the wireless device 100*a* to 100*f* and the wireless device 100*a* to 100*f*} and/or {the BS 200 and the BS 200} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, suggestions, methods and/or operational flowcharts described in the present disclosure. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, suggestions, methods and/or operational flowcharts described in the present disclosure. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with radio frequency (RF) unit(s). In the present disclosure, the first wireless device 100 may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, suggestions, methods and/or operational flowcharts described in the present disclosure. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, suggestions, methods and/or operational flowcharts described in the present disclosure. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may he implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. Descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas may be a plurality of physical antennas or a plurality of logical antennas (e.g., antenna ports).

The one or more transceivers 106 and 206 may convert received radio signals/channels, etc., from RF band signals into baseband signals in order to process received user data, control information, radio signals/channels, etc., using the one or more processors 102 and 202. The one Or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the transceivers 106 and 206 can up-convert OFDM baseband signals to a carrier frequency by their (analog) oscillators and/or filters under the control of the processors 102 and 202 and transmit the up-converted OFDM signals at the carrier frequency. The transceivers 106 and 206 may receive OFDM signals at a carrier frequency and down-convert the OFDM signals into OFDM baseband signals by their (analog) oscillators and/or filters under the control of the transceivers 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
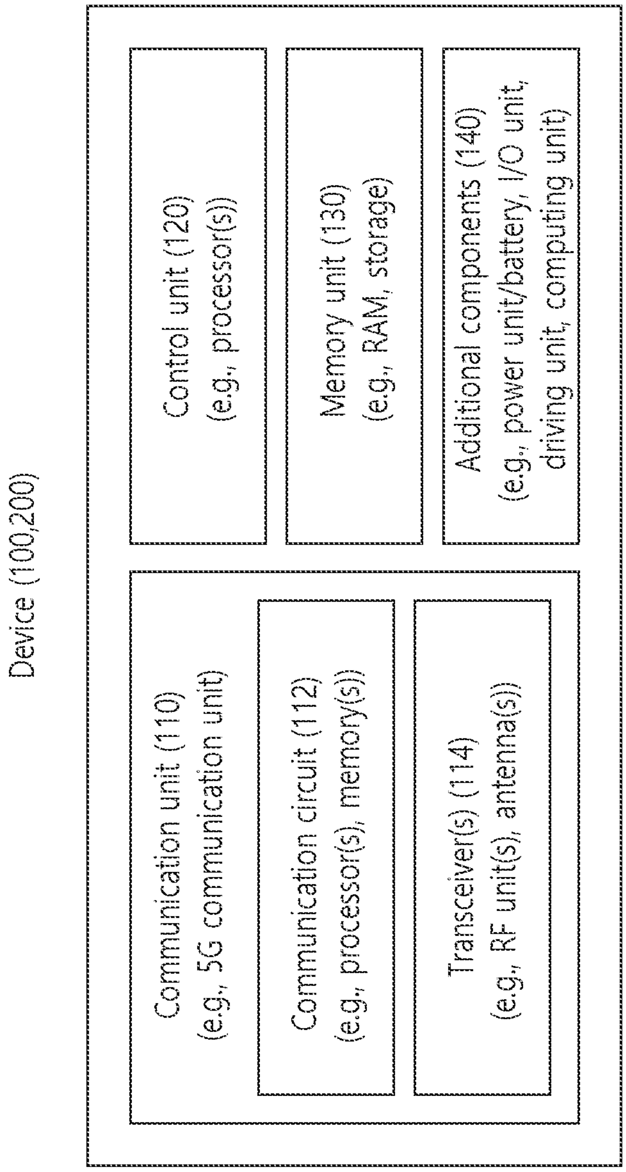
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100*a* of FIG. 1), the vehicles (100*b*-1 and 100*b*-2 of FIG. 1), the XR device (100*c* of FIG. 1), the hand-held device (100*d* of FIG. 1), the home appliance (100*e* of FIG. 1), the IoT device (100*f* of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

Figure 4:
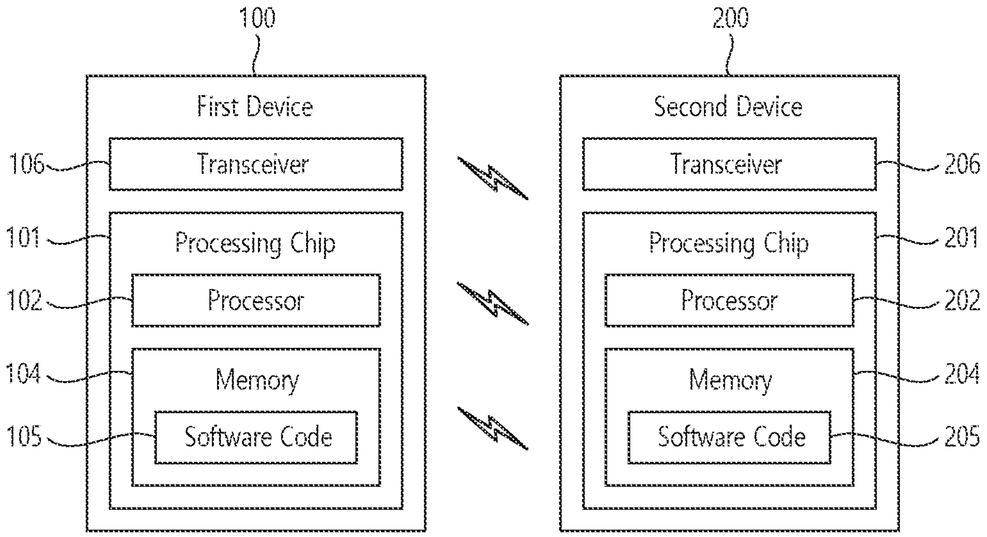
FIG. 4 shows another example of wireless devices to which implementations of the present disclosure is applied.

FIG. 4 shows another example of wireless devices to which implementations of the present disclosure is applied.

Referring to FIG. 4, wireless devices 100 and 200 may correspond to the wireless devices 100 and 200 of FIG. 2 and may be configured by various elements, components, units/portions, and/or modules.

The first wireless device 100 may include at least one transceiver, such as a transceiver 106, and at least one processing chip, such as a processing chip 101. The processing chip 101 may include at least one processor, such a processor 102, and at least one memory, such as a memory

104. The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 may perform one or more layers of the radio interface protocol.

The second wireless device 200 may include at least one transceiver, such as a transceiver 206, and at least one processing chip, such as a processing chip 201. The processing chip 201 may include at least one processor, such a processor 202, and at least one memory, such as a memory 204. The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 may perform one or more layers of the radio interface protocol.

Figure 5:
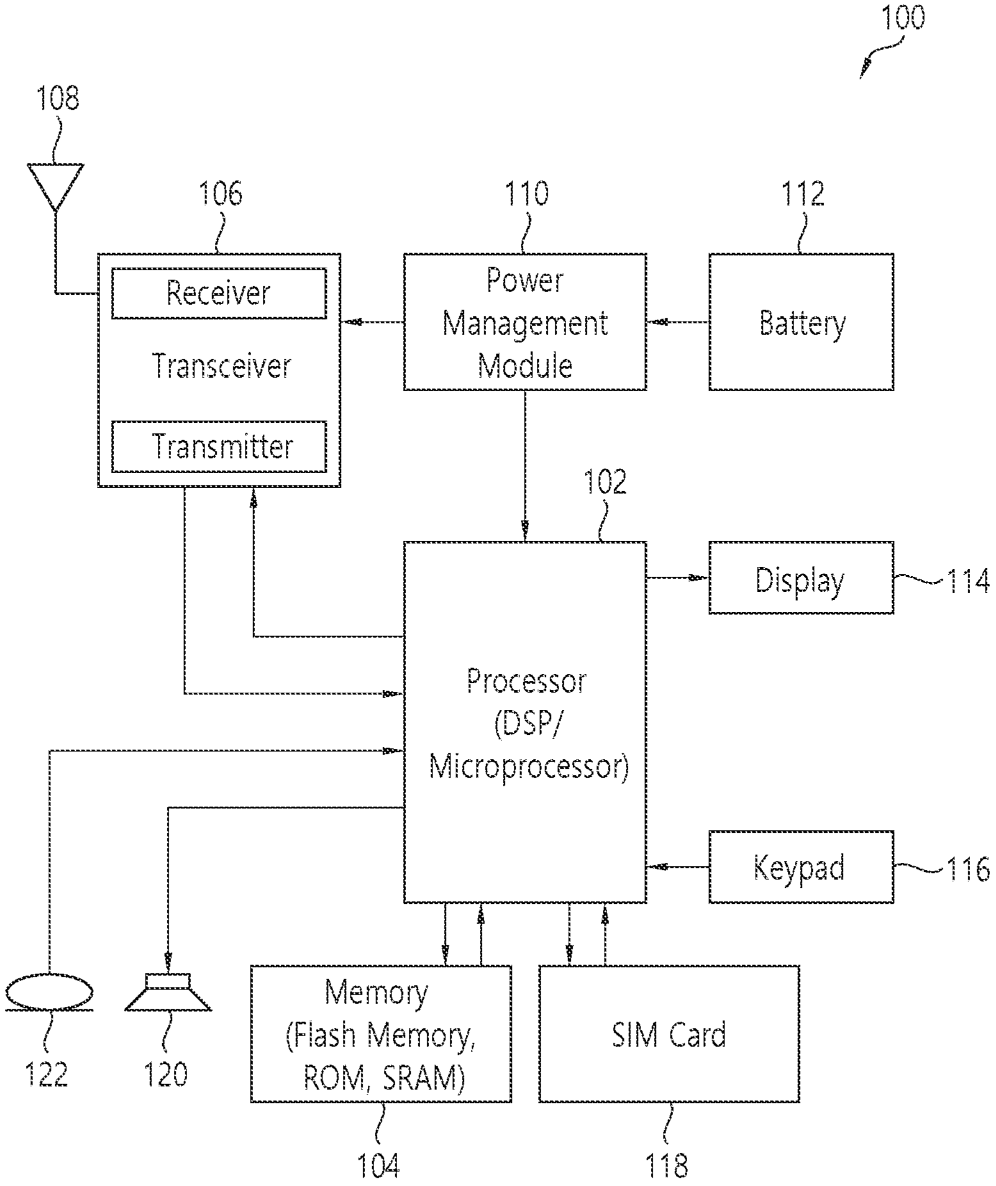
FIG. 5 shows an example of UE to which implementations of the present disclosure is applied.

FIG. 5 shows an example of UE to which implementations of the present disclosure is applied.

Referring to FIG. 5, a UE 100 may correspond to the first wireless device 100 of FIG. 2 and/or the first wireless device 100 of FIG. 4.

A UE 100 includes a processor 102, a memory 104, a transceiver 106, one or more antennas 108, a power management module 110, a battery 1112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 16 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 6:
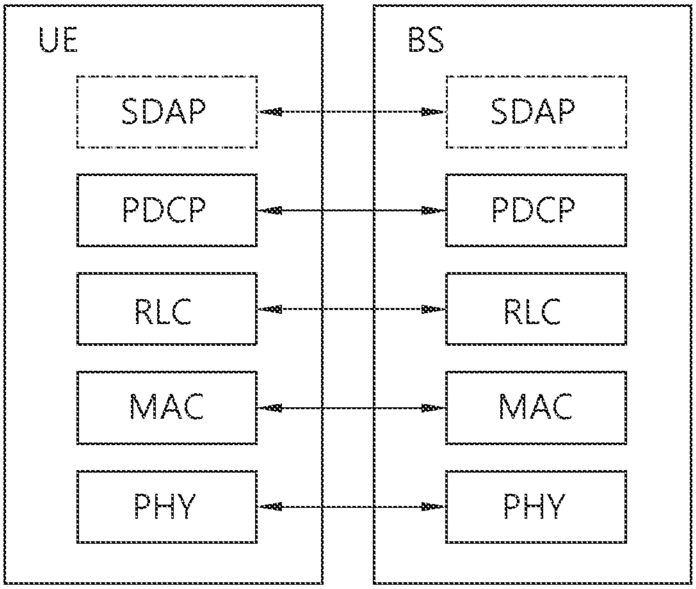
FIGS. 6 and 7 show an example of protocol stacks in a 3GPP based wireless communication system to which implementations of the present disclosure is applied.
Figure 7:
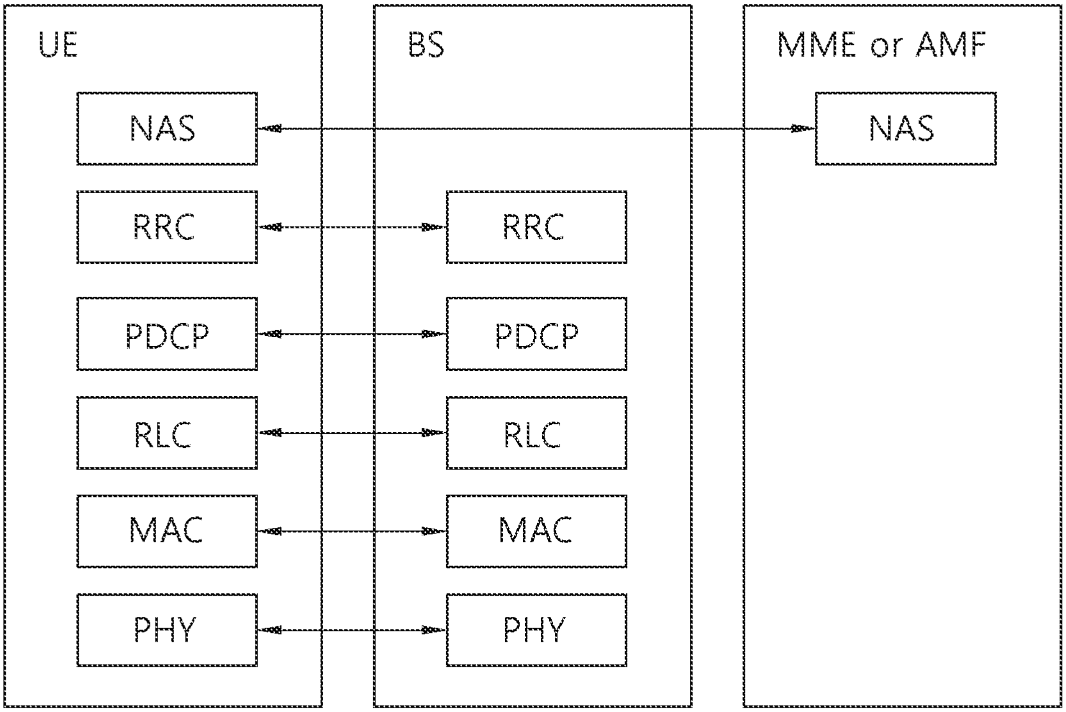

FIGS. 6 and 7 show an example of protocol stacks in a 3GPP based wireless communication system to which implementations of the present disclosure is applied.

In particular, FIG. 6 illustrates an example of a radio interface user plane protocol stack between a UE and a BS and FIG. 7 illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 6, the user plane protocol stack may be divided into Layer 1 (i.e., a PHY layer) and Layer 2. Referring to FIG. 7, the control plane protocol stack may be divided into Layer 1 (i.e., a PHY layer), Layer 2, Layer 3 (e.g., an RRC layer), and a non-access stratum (NAS) layer. Layer 1, Layer 2 and Layer 3 are referred to as an access stratum (AS).

In the 3GPP LTE system, the Layer 2 is split into the following sublayers: MAC, RLC, and PDCP. In the 3GPP NR system, the Layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G core network quality of service (QoS) flows.

In the 3GPP NR system, the main services and functions of the MAC sublayer include: mapping between logical channels and transport channels; multiplexing/de-multiplexing of MAC SDUs belonging to one or different logical channels into/from transport blocks (TB) delivered to/from the physical layer on transport channels; scheduling information reporting; error correction through hybrid automatic repeat request (HARQ) (one HARQ entity per cell in case of carrier aggregation (CA)); priority handling between LIES by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use.

Different kinds of data transfer services are offered by MAC. To accommodate different kinds of data transfer services, multiple types of logical channels are defined, i.e., each supporting transfer of a particular type of information. Each logical channel type is defined by what type of information is transferred. Logical channels are classified into two groups: control channels and traffic channels. Control channels are used for the transfer of control plane information only, and traffic channels are used for the transfer of user plane information only. Broadcast control channel (BCCH) is a downlink logical channel for broadcasting system control information, paging control channel (PCCH) is a downlink logical channel that transfers paging information, system information change notifications and indications of ongoing public warning service (PWS) broadcasts, common control channel (CCCH) is a logical channel for transmitting control information between UEs and network and used for UEs having no RRC connection with the network, and dedicated control channel (DCCH) is a point-to-point bi-directional logical channel that transmits dedicated control information between a UE and the network and used by UEs having an RRC connection. Dedicated traffic channel (DTCH) is a point-to-point logical channel, dedicated to one UE, for the transfer of user information. A DTCH can exist in both uplink and downlink. In downlink, the following connections between logical channels and transport channels exist: BCCH can be mapped to broadcast channel (BCH); BCCH can be mapped to downlink shared channel (DL-SCH); PCCH can be mapped to paging channel (PCH); CCCH can be mapped to DL-SCH; DCCH can be mapped to DL-SCH; and DTCH can be mapped to DL-SCH. In uplink, the following connections between logical channels and transport channels exist: CCCH can be mapped to uplink shared channel (UL-SCH); DCCH can be mapped to UL-SCH; and DTCH can be mapped to UL-SCH.

The RLC sublayer supports three transmission modes: transparent mode (TM), unacknowledged mode (UM), and acknowledged node (AM). The RLC configuration is per logical channel with no dependency on numerologies and/or transmission durations. In the 3GPP NR system, the main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the PDCP sublayer for the user plane include: sequence numbering; header compression and decompression using robust header compression (ROHC); transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

In the 3GPP NR system, the main services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5GC or NG-RAN; establishment, maintenance and release of an RRC connection between the UE and NG-RAN; security functions including key management; establishment, configuration, maintenance and release of signaling radio bearers (SRBs) and data radio bearers (DRBs); mobility functions (including: handover and context transfer, UE cell selection and reselection and control of cell selection and reselection, inter-RAT mobility); QoS management functions; UE measurement reporting and control of the reporting; detection of and recovery from radio link failure; NAS message transfer to/from NAS from/to UE.

Figure 8:
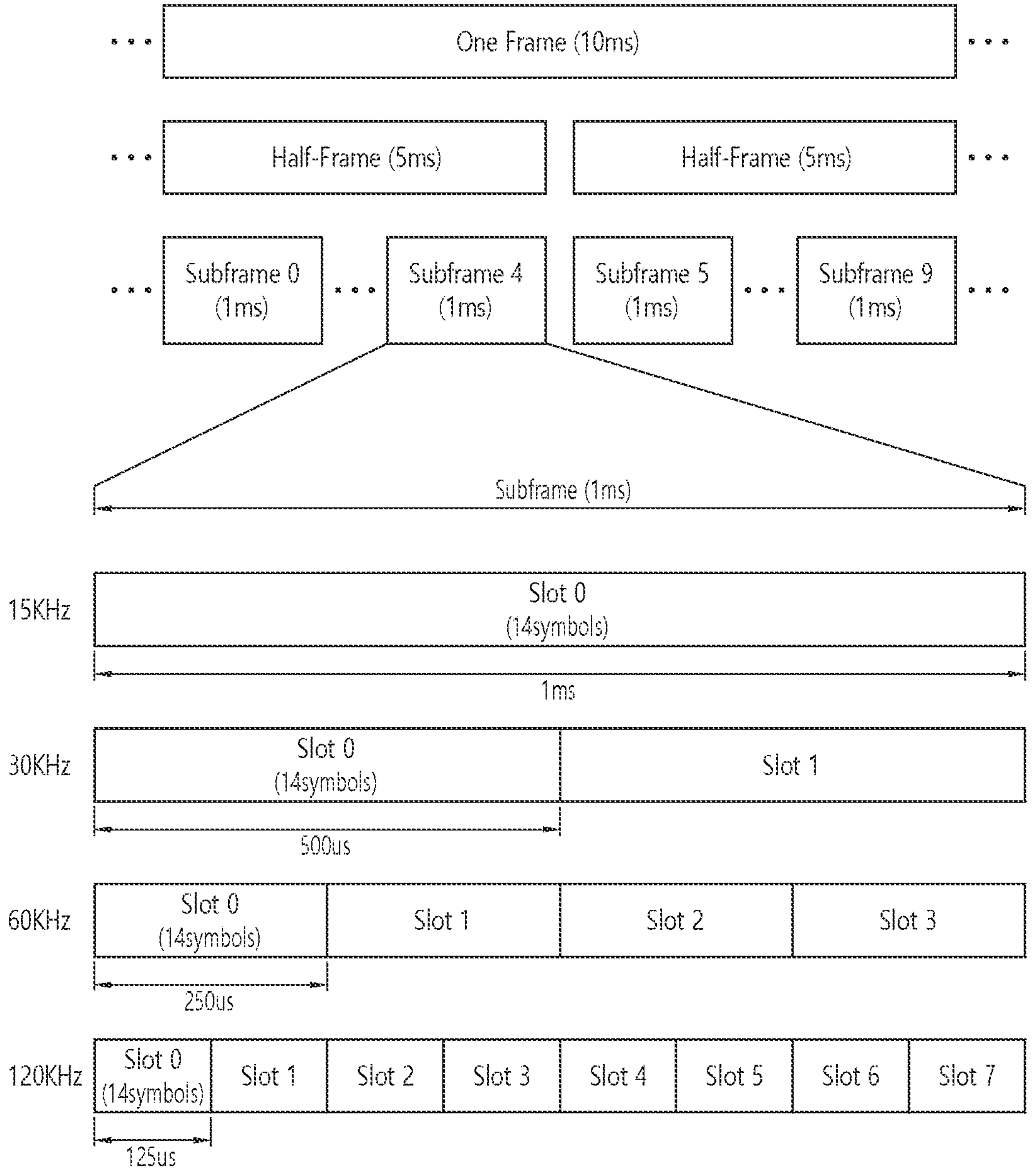
FIG. 8 shows a frame structure in a 3GPP based wireless communication system to which implementations of the present disclosure is applied.

FIG. 8 shows a frame structure in a 3GPP based wireless communication system to which implementations of the present disclosure is applied.

The frame structure shown in FIG. 8 is purely exemplary and the number of subframes, the number of slots, and/or the number of symbols in a frame may be variously changed. In the 3GPP based wireless communication system, OFDM numerologies (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g., a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 8, downlink and uplink transmissions are organized into frames. Each frame has $T_f$=10 ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\beta f=2^u*15$ kHz.

Table 1 shows the number of OFDM symbols per slot $$N_{symb}^{slot},$$

the number of slots per frame $$N_{slot}^{frame,u},$$

and the number of slots per subframe $$N_{slot}^{subframe,u}$$

for the normal CP, according to the subcarrier spacing βf=2^u*15 kHz.

TABLE 1

| | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 2 shows the number of OFDM symbols per slot $$N_{symb}^{slot},$$

the number of slots per frame $$N_{slot}^{frame,u},$$

and the number of slots per subframe $$N_{slot}^{subframe,u}$$

for the extended CP, according to the subcarrier spacing βf=2^u*15 kHz.

TABLE 2

| | $N^{slot}_{symb}$ | $N^{frame,u}_{slot}$ | $N^{subframe,u}_{slot}$ |
|---|---|---|---|
| 2 | 12 | 40 | 4 |

A slot includes plural symbols (e.g., 14 or 12 symbols) in the time domain. For each numerology (e.g., subcarrier spacing) and carrier, a resource grid of $$N_{grid,x}^{size,u} * N_{sc}^{RB}$$

subcarriers and $$N_{symb}^{subframe,u}$$

OFDM symbols is defined, starting at common resource block (CRB)

$$N_{grid}^{start,u}$$

indicated by higher-layer signaling (e.g., RRC signaling), where $$N_{grid,x}^{size,u}$$

is the number of resource blocks (RBs) in the resource grid and the subscript x is DL for downlink and UL for uplink.

$$N_{sc}^{RB}$$

is the number of subcarriers per RB. In the 3GPP based wireless communication system, $$N_{sc}^{RB}$$

is 12 generally. There is one resource grid for a given antenna port p, subcarrier spacing configuration u, and transmission direction (DL or UL). The carrier bandwidth $$N_{grid}^{size,u}$$

for subcarrier spacing configuration u is given by the higher-layer parameter (e.g., RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the 3GPP based wireless communication system, an RB is defined by 12 consecutive subcarriers in the frequency domain. In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration at coincides with 'point A' which serves as a common reference point for resource block grids. In the 3GPP NR system, PRBs are defined within a bandwidth part (BWP) and numbered from 0 to $$N_{BWP,i}^{size} - 1,$$

where i is the number of the bandwidth part. The relation between the physical resource block rims in the bandwidth part i and the common resource block $n_{CRB}$ is as follows:

$$n_{PRB} = n_{CRB} + N_{BWP,i}^{size},$$

where $$N_{BWP,i}^{size}$$

is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

The NR frequency band may be defined as two types of frequency range, i.e., FR1 and FR2. The numerical value of the frequency range may be changed. For example, the frequency ranges of the two types (FR1 and FR2) may be as shown in Table 3 below. For ease of explanation, in the frequency ranges used in the NR system, FR1 may mean "sub 6 GHz range", FR2 may mean "above 6 GHz range," and may be referred to as millimeter wave (mmW).

TABLE 3

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 4 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 4

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

In the present disclosure, the term "cell" may refer to a geographic area to which one or more nodes provide a communication system, or refer to radio resources. A "cell" as a geographic area may be understood as coverage within which a node can provide service using a carrier and a "cell" as radio resources (e.g., time-frequency resources) is associated with bandwidth which is a frequency range configured by the carrier. The "cell" associated with the radio resources is defined by a combination of downlink resources and uplink resources, for example, a combination of a DL component carrier (CC) and a UL CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times. In CA, two or more CCs are aggregated. A UE may simultaneously receive or transmit on one or multiple CCs depending on its capabilities. CA is supported for both contiguous and non-contiguous CCs. When CA is configured, the UE only has one RRC connection with the network. At RRC connection establishment/re-establishment/handover, one serving cell provides the NAS mobility information, and at RRC connection re-establishment/handover, one serving cell provides the security input. This cell is referred to as the primary cell (PCell). The PCell is a cell, operating on the primary frequency, in which the UE either performs the initial connection establishment procedure or initiates the connection re-establishment procedure. Depending on UE capabilities, secondary cells (SCells) can he configured to form together with the PCell a set of serving cells. An SCell is a cell providing additional radio resources on top of special cell (SpCell). The configured set of serving cells for a UE therefore always consists of one PCell and one or more SCells. For dual connectivity (DC) operation, the term SpCell refers to the PCell of the master cell group (MCG) or the primary SCell (PSCell) of the secondary cell group (SCG). An SpCell supports PUCCH transmission and contention-based random access, and is always activated. The MCG is a group of serving cells associated with a master node, comprised of the SpCell (PCell) and optionally one or more SCells. The SCG is the subset of serving cells associated with a secondary node, comprised of the PSCell and zero or more SCells, for a UE configured with DC. For a UE in RRC_CONNECTED not configured with CA/DC, there is only one serving cell comprised of the PCell. For a UE RRC_CONNECTED configured with CA/DC, the term "serving cells" is used to denote the set of cells comprised of the SpCell(s) and all SCells. In DC, two MAC entities are configured in a UE: one for the MCG and one for the SCG.

Figure 9:
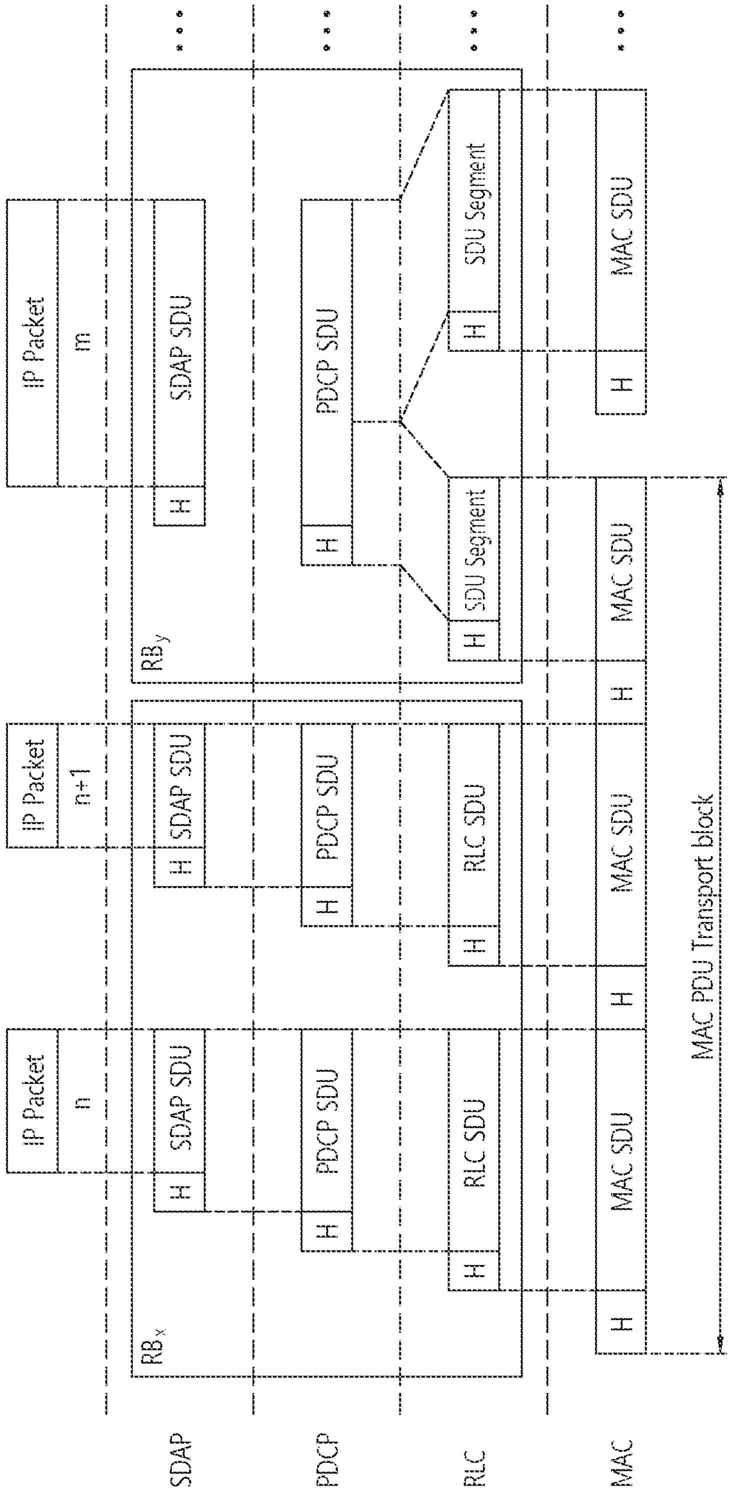
FIG. 9 shows a data flow example in the 3GPP NR system to which implementations of the present disclosure is applied.

FIG. 9 shows a data flow example in the 3GPP NR system to which implementations of the present disclosure is applied.

Referring to FIG. 9, "RB" denotes a radio bearer, and "H" denotes a header. Radio bearers are categorized into two groups: DRBs for user plane data and SRBs for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels physical uplink shared channel (PUSCH) and physical random access channel (PRACH), respectively, and the downlink transport channels DL-SCH, BCH and PCH are mapped to physical downlink shared channel (PDSCH), physical broadcast channel (PBCH) and PDSCH, respectively. In the PHY layer, uplink control information (UCI) is mapped to physical uplink control channel (PUSCH), and downlink control information (DCI) is mapped to physical downlink control channel (PDSCH). A MAC PDU related to UL-SCH is transmitted by a UE via a PUSCH based on an UL grant, and a MAC PDU related to DL-SCH is transmitted by a BS via a PDSCH based on a DL assignment.

Hereinafter, possible RRC states in a wireless communication system are described.

There may be 3 possible RRC states in a wireless communication system. The 3 possible RRC states comprise: RRC_IDLE, RRC_CONNECTED and/or RRC_INACTIVE.

In RRC_IDLE (or, idle mode/state), RRC context for communication between a UE and a network may not be established in RAN, and the UE may not belong to a specific cell. Also, in RRC_IDLE, there is no core network connection for the UE. Since the device remains in sleep mode in most of the time to reduce battery consumption, data transfer between the UE and the network may not occur. UEs in RRC_IDLE may periodically wake-up to receive paging messages from the network. Mobility may be handled by the UE through cell reselection. Since uplink synchronization is not maintained, the UE may not perform uplink transmission other than transmissions for random access (e.g., random access preamble transmission) to move to RRC_CONNECTED.

In RRC_CONNECTED (or, connected state/mode), RRC context for communication between a UE and a network may be established in RAN. Also, in RRC_CONNECTED, core network connection is established for the UE. Since the UE belongs to a specific cell, cell-radio network temporary identifier (C-RNTI) for signalings between the UE and the network may be configured for the UE. Data transfer between the UE and the network may occur. Mobility may be handled by the network—that is, the UE may provide measurement report to the network, and the network may transmit mobility commands to the UE to perform a mobility. Uplink time alignment may need to be established based on a random access and maintained for data transmission.

In RRC_INACTIVE (or, inactive state/mode), RRC context for communication between a UE and a network may be kept in RAN. Data transfer between the UE and the network may not occur. Since core network connection may also he kept for the UE, the UE may fast transit to a connected state for data transfer. In the transition, core network signaling may not be needed. The RRC context may be already established in the network and idle-to-active transitions can be handled in the RAN. The UE may be allowed to sleep in a similar way as in RRC_IDLE, and mobility may be handled through cell reselection without involvement of the network. The RRC_INACTIVE may be construed as a mix of the idle state and the connected state.

The UE may transit to RRC_CONNECTED from RRC_IDLE by performing initial attach procedure or RRC connection establishment procedure.

The UE may transit to RRC_IDLE from RRC_CONNECTED when detach, RRC connection release (e.g., when the UE receives RRC release message) and/or connection failure (e.g., radio link failure (RLF)) has occurred. The UE may transit to RRC_INACTIVE from RRC_CONNECTED when RRC connection is suspended (e.g., when the UE receives RRC release message including a suspend configuration), and transit to RRC_CONNECTED from RRC_INACTIVE when RRC connection is resume by performing RRC connection resume procedure. The UE may transit to RRC_IDLE from RRC_INACTIVE when connection failure such as RLF has occurred.

Figure 10:
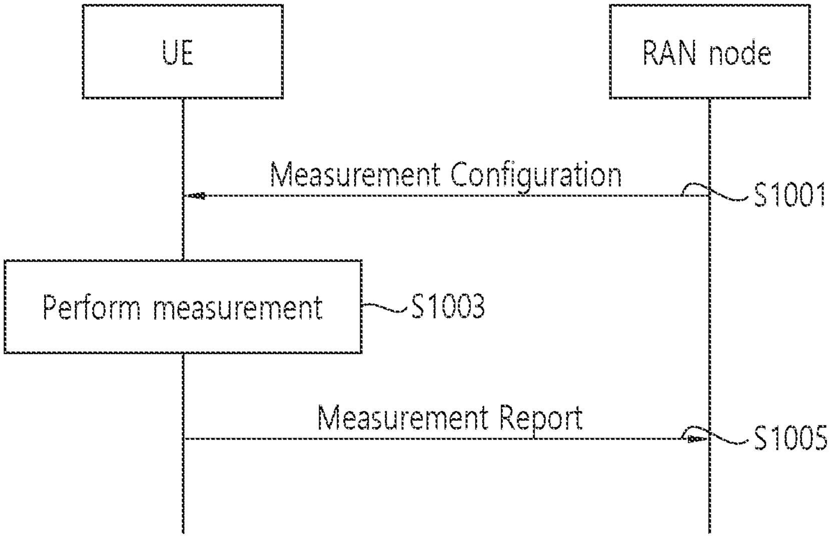
FIG. 10 shows an example of a method for a measurement and reporting to which technical features of the present disclosure can be applied.

FIG. 10 shows an example of a method for a measurement and reporting to which technical features of the present disclosure can be applied.

Referring to FIG. 10, in step S1001, a UE may receive a measurement configuration from a RAN node. The measurement configuration may comprise a list of measurement objects (measObject), a list of report configurations (reportConfig), and a list of measurement identifiers ID, measID). The measurement ID may be related to/correspond to a combination of a measurement object and a report configuration. The measurement object may indicate object information regarding an object the UE is supposed to measure. For example, the object information may comprise a measurement frequency and/or a list of cells including serving cell/neighbor cell(s). The report configuration may comprise a condition to perform an action corresponding to a report type in the report configuration.

For example, the condition may comprise a report condition that should be satisfied for the UE to transmit a measurement report.

For another example, the condition may comprise a mobility condition that should be satisfied for the UE to perform a conditional mobility. If the report type is set to 'condTriggerConfig', the condition may be the mobility condition. The report type may also be referred to as a purpose of the condition.

In step S1003, the UE may perform a measurement based on the measurement configuration. For example, the UE may measure the serving cell and/or the neighbor cell(s) on the measurement frequency specified by the measurement object, to obtain a measurement result for the serving cell and/or the neighbor cell(s). The measurement result may comprise a cell quality/signal strength/signal quality/channel quality/channel state/reference signal received power (RSRP)/reference signal received quality (RSRQ) of the serving cell and/or the neighbor cell(s).

In step S1005, the UE may transmit a measurement report to the RAN node. The UE may transmit the measurement report comprising the measurement result for the serving cell and/or the neighbor cell(s) to the RAN node based on the report configuration (e.g., when the report condition is satisfied).

According to various embodiments, the report condition may comprise a cell quality condition including at least one of an event, time-to-trigger (TTT), offset value, or threshold values. The cell quality condition for an event may be satisfied if an entering condition for the event is satisfied for at least the TTT. For example, the entering condition for event A1 may be satisfied if a cell quality of a serving cell becomes better than a threshold. The entering condition for event A2 may be satisfied if a cell quality of a serving cell becomes worse than a threshold. The entering condition for event A3 may be satisfied if a cell quality of a neighbor cell becomes better than that of a serving cell by an offset. The entering condition for event A4 may be satisfied if a cell quality of a neighbor cell becomes better than a threshold. The entering condition for event A5 may be satisfied if a cell quality of a serving cell becomes worse than a serving cell threshold, and a cell quality of a neighbor cell becomes better than a neighbor cell threshold.

According to various embodiments, the measurement configuration may comprise/be related to at least one of a measurement period, a measurement gap, or a measurement gap repetition period. The measurement period refers to a time spacing between two consecutive moments at which a measurement on a neighbor cell is performed and/or a cell quality of the neighbor cell is obtained. The measurement gap refers to a gap/time period during which no transmission and reception happens for the UE to measure a neighbor cell/inter-frequency. The measurement gap repetition period refers to a time interval in which successive measurement gaps repetitively occurs. In other words, the measurement gap repetition period refers to a time interval between successive measurement gaps.

According to various embodiments, the measurement configuration may comprise a configuration parameter 's-MeasureConfig', The s-MeasureConfig may be a threshold for NR SpCell RSRP measurement controlling when the UE is required to perform measurements on non-serving cells. If the s-MeasureConfig is set to ssb-RSRP, the threshold may be cell RSRP based on SS/PBCH block. If the s-MeasureConfig is set to csi-RSRP, the threshold may be cell RSRP of CSI-RS.

Hereinafter, measurement relaxation and/or radio resource management (RRM) measurement relaxation is described.

When a UE is in RRC_IDLE/INACTIVE, the UE may perform a neighbour cell measurement (e.g., RRM measurement) to support mobility. If the serving cell quality is above the threshold (If the serving cell fulfils $Srxlev > s_{IntraSearchP}$ and $Squal > S_{IntraSearchQ}$), the UE may choose not to perform the neighbour cell measurement (i.e., skip performing the neighbor cell measurement) to reduce power consumption, as it is expected that cell reselection will not occur soon. Or, when a UE is in RRC_CONNECTED, if the serving cell quality is above the threshold (i.e., s-measure), the UE may not perform the neighbour cell measurement.

However, if the serving cell quality is below the threshold so that the UE is performing the neighbour cell measurement, the UE may need to perform neighbour cell measurement on all the configured frequencies even if the serving cell quality is just below the threshold.

Therefore, it may be required to reduce the power consumption while the UE is performing neighbour cell measurement. As one of methods for reducing power consumption, measurement relaxation and/or relaxed measurement may be used. In the relaxed measurement, UE may relax some of requirements regarding measurement.

When the UE is required to perform measurements of intra-frequency cells or NR inter-frequency cells or inter-RAT frequency cells according to the measurement rules:

1> if lowMobilityEvaluation is configured and cellEdgeEvaluation is not configured; and 1> if the UE has performed normal intra-frequency, NR inter-frequency, or inter-RAT frequency measurements for at least $T_{SearchDeltaP}$ after (re-)selecting a new cell; and 1> if the relaxed measurement criterion for UE with low mobility is fulfilled for a period of $T_{SearchDeltaP}$:

2> the UE may choose to perform measurements with relaxed requirements for intra-frequency cells;

2> if the serving cell fulfils $Srxlev > S_{nonIntraSearchP}$ and $Squal > S_{nonIntraSearchQ}$:

3> for any NR inter-frequency or inter-RAT frequency of higher priority, if less than 1 hour has passed since measurements of corresponding frequency cell(s) for cell reselection were last performed; and, 3> if highPriorityMeasRelax is configured with value true:

4> the UE may choose not to perform measurement on this frequency cell(s) (i.e., the UE may skip performing measurement on this frequency cell(s));

3> else (i.e., the serving cell fulfils $Srxlev \leq S_{nonIntraSearchP}$ or $Squal \leq S_{nonIntraSearchQ}$):

4> the UE may choose to perform measurements with relaxed requirements for NR inter-frequency cells or inter-RAT frequency cells;

1> if cellEdgeEvaluation is configured and lowMobilityEvaluation is not configured; and 1> if the Relaxed measurement criterion for UE not at cell edge is fulfilled:

2> the UE may choose to perform measurements with relaxed requirements for intra-frequency cells;

2> if the serving cell fulfils $Srxlev \leq S_{nonIntraSearchP}$ or $Squal \leq S_{nonIntraSearchQ}$:

3> the UE may choose to perform measurement with relaxed requirements for NR inter-frequency cells or inter-RAT frequency cells;

1> if both lowMobilityEvaluation and cellEdgeEvaluation are configured:

2> if the UE has performed normal intra-frequency, NR inter-frequency, or inter-RAT frequency measurements for at least $T_{SearchDeltaP}$ after (re-)selecting a new cell; and 2> if the relaxed measurement criterion for UE with low mobility is fulfilled for a period of $T_{SearchDeltaP}$; and 2> if the relaxed measurement criterion for UE not at cell edge is fulfilled:

3> for any intra-frequency, NR inter-frequency, or inter-RAT frequency, if less than 1 hour has passed since measurements of corresponding frequency cell(s) for cell reselection were last performed:

4> the UE may choose not to perform measurement for measurements on this frequency cell(s) (i.e., skip performing measurements on this frequency cell(s));

2> else:

3> if the UE has performed normal intra-frequency, NR inter-frequency, or inter-RAT frequency measurements for at least $T_{SearchDeltaP}$ after (re-)selecting a new cell, and the relaxed measurement criterion for UE with low mobility is fulfilled for a period of $T_{SearchDeltaP}$; or, 3> if the relaxed measurement criterion for UE not at cell edge is fulfilled:

4> if combineRelaxedMeasCondition is not configured:

5> the UE may choose to perform measurements with relaxed requirements for intra-frequency cells, NR inter-frequency cells of equal or lower priority, or inter-RAT frequency cells of lower priority;

5> if the serving cell fulfills $Srxlev \leq S_{nonIntraSearchP}$ or $Squal \leq S_{nonIntraSearchQ}$:

6> the UE may choose to perform measurements with relaxed requirements for NR inter-frequency cells of higher priority, or inter-RAT frequency cells of higher priority.

The above relaxed measurements and no measurement may not be applicable for frequencies that are included in VarMeasIdleConfig, if configured and for which the UE supports dual connectivity or carrier aggregation between those frequencies and the frequency of the current serving cell.

In the disclosure, performing measurements with relaxed requirements may comprise at least one of:

skipping a measurement;

performing a measurement based on a relaxed measurement period that is longer than that for the normal measurement; or performing a measurement on a smaller number of measurement targets than that for the normal measurement.

The measurement targets may comprise at least one of cells, carriers, or synchronization signal/physical broadcast channel (SS/PBCH) blocks.

In the disclosure, the UE may be configured with lowMobilityEvaluation comprising $S_{SearchDeltaP}$ (dB) and $T_{SearchDeltaP}$ (seconds). The UE may be considered as being in a low mobility (i.e., low mobility criterion for the UE is satisfied) when $Srxlev_{Ref} - Srxlev) < S_{SearchDeltaP}$) (i.e., when serving cell RSRP/RSRQ change ($Srxlev_{Ref}$−Srxlev) is smaller than a threshold $S_{SearchDeltaP}$ for a time period $T_{SearchDeltaP}$). The relaxed measurement criterion for UE with low mobility may be fulfilled when the UE is in a low mobility (i.e., when ($Srxlev_{Ref}$−Srxlev)<$S_{SearchDeltaP}$). $S_{SearchThresholdQ}$ is configured). Herein, the Srxlev is the current Srxlev value of the serving cell (dB), and the Squal is the current Squal value of the serving cell (dB).

Definitions of the parameters used in the disclosure are illustrated in table 5:

TABLE 5

| | |
|---|---|
| Srxlev | Cell selection RX level value (dB), defined as Srxlev = $Q_{rxlevmeas}$ − ($Q_{rxlevmin}$ + $Q_{rxlevminoffset}$) − $P_{compensation}$ − $Qoffset_{temp}$ |
| Squal | Cell selection quality value (dB), defined as $Q_{qualmeas}$ − ($Q_{qualmin}$ + $Q_{qualminoffset}$) − $Qoffset_{temp}$. |
| $Qoffset_{temp}$ | Offset temporarily applied to a cell (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm). If the UE supports SUL frequency for this cell, Qrxlevmin is obtained from q-RxLevMinSUL, if present, in SIB1, SIB2 and SIB4, additionally, if $Q_{rxlevminoffsetcellSUL}$ is present in SIB3 and SIB4 for the concerned cell, this cell specific offset is added to the corresponding Qrxlevmin to achieve the required minimum RX level in the concerned cell; else Qrxlevmin is obtained from q-RxLevMin in SIB1, SIB2 and SIB4, additionally, if $Q_{rxlevminoffsetcell}$ is present in SIB3 and SIB4 for the concerned cell, this cell specific offset is added to the corresponding Qrxlevmin to achieve the required minimum RX level in the concerned cell. |
| $Q_{qualmin}$ | Minimum required quality level in the cell (dB). Additionally, if $Q_{qualminoffsetcell}$ is signalled for the concerned cell, this cell specific offset is added to achieve the required minimum quality level in the concerned cell. |
| $Q_{rxlevminoffset}$ | Offset to the signaled $Q_{rxlevmin}$ taken into account the Srxlev evaluation as a result of a periodic search for a higher priority PLMN while camped normally in a VPLMN. |
| $Q_{qualminoffset}$ | Offset to the signalled $Q_{qualmin}$ taken into account in the Squal evaluation as a result of a periodic search for a higher priority PLMN while camped normally in a VPLMN. |
| $P_{compensation}$ | If the UE supports the additionalPmax in the NR-NS-PmaxList, if present, in SIB1, SIB2 and SIB4: max($P_{EMAX1}$ − $P_{PowerClass}$, 0) − (min($P_{EMAX2}$, $P_{PowerClass}$) − min($P_{EMAX1}$, $P_{PowerClass}$)) (dB); else: max($P_{EMAX1}$ − $P_{PowerClass}$, 0) (dB) |
| $P_{EMAX1}$, $P_{EMAX2}$ | Maximum TX power level of a UE may use when transmitting on the uplink in the cell (dBm) defined as $P_{EMAX}$. If UE supports SUL frequency for this cell, $P_{EMAX1}$ and $P_{EMAX2}$ are obtained from the p-Max for SUL in SIB1 and NR-NS-PmaxList for SUL respectively in SIB1, SIB2 and SIB4, else $P_{EMAX1}$ and $P_{EMAX2}$ are obtained from the p-Max and NR-NS-PmaxList respectively in SIB1, SIB2 and SIB4 for normal UL |
| $P_{PowerClass}$ | Maximum RF output power of the UE (dBm) according to the UE power class. |
| $S_{SearchDeltaP}$ | The threshold (in dB) on Srxlev variation relaxed measurement |
| $T_{SearchDeltaP}$ | The time period over which the Srxlev variation is evaluated for relaxed measurement |
| $S_{SearchThresholdP}$ | The Srxlev threshold (in dB) for relaxed measurement |
| $S_{SearchThresholdQ}$ | The Squal threshold (in dB) for relaxed measurement |
| $S_{IntraSearchP}$ | The Srxlev threshold (in dB) for intra-frequency measurements |
| $S_{IntraSearchQ}$ | The Squal threshold (in dB) for intra-frequency measurements |
| $S_{nonIntraSearchP}$ | The Srxlev threshold (in dB) for NR inter-frequency and inter-RAT measurements |
| $S_{nonIntraSearchQ}$ | The Squal threshold (in dB) for NR inter-frequency and inter-RAT measurements |

Herein, the Srxlev is the current Srxlev value of the serving cell (dB), and the $Srxlev_{Ref}$ is the reference Srxlev value of the serving cell (dB). The $Srxlev_{Ref}$ is set as:

1> After selecting or reselecting a new cell, or

1> If (Srxlev−$Srxlev_{Ref}$)>0, or

1> If the relaxed measurement criterion has not been met for $T_{SearchDeltaP}$:

2> The UE shall set the value of $Srxlev_{Ref}$ to the current Srxlev value of the serving cell.

In the disclosure, the UE may be configured with cellEdgeEvaluation comprising $S_{SearchThresholdP}$, and optionally $S_{SearchThresholdQ}$. The UE may be considered as not being at cell edge (i.e., not being at cell edge criterion for the UE is satisfied) when Srxlev>$S_{SearchThresholdP}$, and Squal>$S_{SearchThresholdQ}$, if $S_{SearchThresholdQ}$ is configured. The relaxed measurement criterion for UE not at cell edge may be fulfilled when the UE is not at cell edge (i.e., when Srxlev>$S_{SearchThresholdP}$, and Squal>$S_{SearchThresholdQ}$, if In the disclosure, an RSRP/RSRQ based stationarity criterion (or, simply stationarity criterion/condition) can be configured for UEs in RRC connected/idle/inactive. If the stationarity criterion is satisfied for a UE, stationarity indication/information informing that the stationary criterion is satisfied for the UE may be reported to the network. Based on the stationarity information, the network can enable RRM measurement relaxation possibly by reconfiguration RRM measurements in RRC connected/idle/inactive. The stationarity criterion may comprise at least one of the low mobility criterion, the relaxed measurement criterion for UE with low mobility, criterion that the UE is in a low mobility, criterion that ($Srxlev_{Ref}$−Srxlev)<$S_{SearchDeltaP}$, or criterion that serving cell RSRP/RSRQ change ($Srxlev_{Ref}$−Srxlev) is smaller than a threshold $S_{SearchDeltaP}$ for a time period $T_{SearchDeltaP}$. Meanwhile, for an RRM measurement by a UE with reduced capabilities (RedCap), the RSRP/RSRQ based stationarity criterion is introduced. It may be assumed that the stationarity criterion is the same as the low mobility criterion which is based on a serving cell RSRP/RSRQ change. That is, if a serving cell RSRP/RSRQ change ($Srxlev_{Ref}$–Srxlev) is smaller than a threshold $S_{SearchDeltaP}$ for a time period $T_{SearchDeltaP}$, the UE may be considered as being in a low mobility. When the UE connected mode satisfies the stationarity criterion, the UE may reports the stationarity information to the network and the network may provide a new measurement configuration to enable RRM relaxation.

From network's perspective, based on the stationarity information reported from the UE, the network should decide how to enable the RRM relaxation by providing the new measurement configuration. For example, the network may exclude or extend a measurement period of a certain frequency from a measurement configuration to which the UE has low possibility to perform a handover. However, if UE only indicates that the UE is in a stationary state in the stationarity information, the network cannot know which frequency to be relaxed. Thus, in addition to reporting the stationarity information, if the UE in a stationary state reports a measurement result for neighbour cell(s), the network can take the measurement results into account for providing the new measurement configuration. For example, if the UE reports some neighbour cells whose cell quality is low, the network may exclude the neighbour cells from the measurement configuration because the UE has low possibility to perform a handover to the neighbour cells.

According to various embodiments, UE may send a measurement report based on measurement report triggering condition(s) related to cell quality (i.e., cell quality-based condition/cell quality condition) and a stationary criterion/condition. For example, UE may send a measurement report if the UE satisfies not only the cell quality-based condition but also the stationarity criterion/condition. Based on the received measurement report, the network may provide a new measurement configuration to enable RRM relaxation for the UE in connected/idle/inactive mode.

Figure 11:
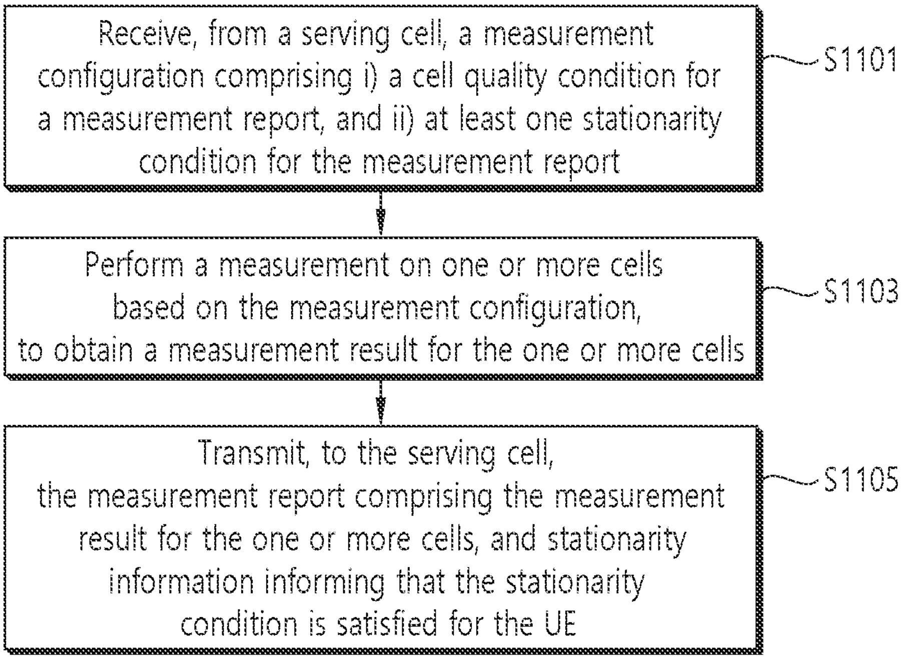
FIG. 11 shows an example of a method performed by a UE according to an embodiment of the present disclosure.

FIG. 11 shows an example of a method performed by a UE according to an embodiment of the present disclosure. The method may also be performed by a wireless device.

Referring to FIG. 11, in step S1101, the UE may receive, from a serving cell, a measurement configuration comprising i) a cell quality condition for a measurement report, and ii) at least one stationarity condition for the measurement report.

In step S1103, the UE may perform a measurement on one or more cells based on the measurement configuration, to obtain a measurement result for the one or more cells.

In step S1105, the UE may transmit, to the serving cell, the measurement report comprising the measurement result for the one or more cells, and stationarity information informing that the at least one stationarity condition is satisfied for the UE. The measurement report may be transmitted based on that i) the measurement result for the one or more cells satisfies the cell quality condition, and ii) the at least one stationarity condition is satisfied for the UE.

According to various embodiments, the measurement result may comprise at least one of a cell quality of the serving cell or a cell quality of at least one neighbour cell.

According to various embodiments, the cell quality condition may comprise at least one of: event A1 condition that the cell quality of the serving cell becomes better than a threshold during at least a period of time-to-trigger (TTT); event A2 condition that the cell quality of the serving cell becomes worse than a threshold during at least a period of TTT; event A3 condition that the cell quality of the at least one neighbour cell becomes beta than that of the serving cell by an offset during at least a period of TTT; event A4 condition that the cell quality of the at least one neighbour cell becomes better than a threshold during at least a period of TTT; or event A5 condition that the cell quality of the serving cell becomes worse than a serving cell threshold and the cell quality of the at least one neighbour cell becomes better than a neighbour cell threshold, during at least a period of TTT.

According to various embodiments, the at least one stationarity condition may comprise at least one of: a condition that a variation in the cell quality of the serving cell is smaller than a threshold for a time period; or a condition that a number of cell reselections during a time period is less than a threshold. The at least one stationarity condition may correspond to at least one of a relaxed measurement condition for stationary UE or a condition that the UE is in a stationary state.

For example, the conditions may be expressed as the below table 6:

TABLE 6

| Expression | State |
|---|---|
| Stationary condition<br>Relaxed measurement condition for stationary UE<br>UE is in a stationary state | Serving cell RSRP/RSRQ variation ($Srxlev_{Ref}$ – Srxlev) is smaller than a thresehold $S_{SearchDeltaP}$ for a time period $T_{SearchDeltaP}$ |

For another example, the conditions may be expressed as the below table 7:

TABLE 7

| Expression | State |
|---|---|
| Stationary condition<br>Relaxed measurement condition for stationary UE<br>UE is in a stationary state | The number of cell reselections during a time period $T_{CRmax}$ is less than a threshold $N_{CR\_M}$. Herein, $T_{CRmax}$ specifies the duration for evaluating allowed amount of cell reselections, and $N_{CR\_M}$ specifies the maximum number of cell reselections to enter a medium-mobility state. |

According to various embodiments, the stationarity information may inform at least one of: the at least one stationarity condition is satisfied for the UE; a relaxed measurement condition for stationary UE is satisfied for the UE; the UE is in a stationary state; a variation in the cell quality of the serving cell is smaller than a threshold for a time period; or a number of cell reselections during a time period is less than a threshold. According to various embodiments, the one or more cells may comprise at least one first cell whose cell quality is worse than a threshold and at least one second cell whose cell quality is better than the threshold. The UE may receive, from the serving cell, a configuration for enabling the UE to perform a relaxed measurement on the at least one first cell after transmitting the stationarity information to the serving cell. The UE may perform the relaxed measurement on the at least one first cell based on the configuration. The configuration may be a new measurement configuration.

According to various embodiments, the performing of the relaxed measurement may comprise skipping a measurement on the at least one first cell.

According to various embodiments, the configuration may comprise one or more measurement target cells including the at least one second cell and excluding the at least one first cell.

According to various embodiments, the UE may perform a normal measurement on the at least one second cell based on the configuration.

According to various embodiments, the performing of the relaxed measurement may comprise performing a measurement on the at least one first cell based on a relaxed measurement period longer than a normal measurement period required for the normal measurement.

According to various embodiments, the configuration may comprise the relaxed measurement period for a measurement on the at least one first cell, and the normal measurement period for a measurement on the at least one second cell.

According to various embodiments, the UE may receive a measurement configuration which includes a first threshold and a second threshold. The UE may performing a measurement on a serving cell and one or more neighbor cells included in the received measurement configuration, at the first time point and the second time point. The UE may calculate a serving cell RSRP change between the first time point and the second time point. The UE may compare the calculated serving cell RSRP change with the first threshold. The UE may compare the measured neighbor cell quality with the second threshold. The UE may transmit the measurement results of the one or more neighbor cells based on the comparison results, if the calculated serving cell RSRP change is below the first threshold and the measured neighbor cell quality is below the second threshold.

Figure 12:
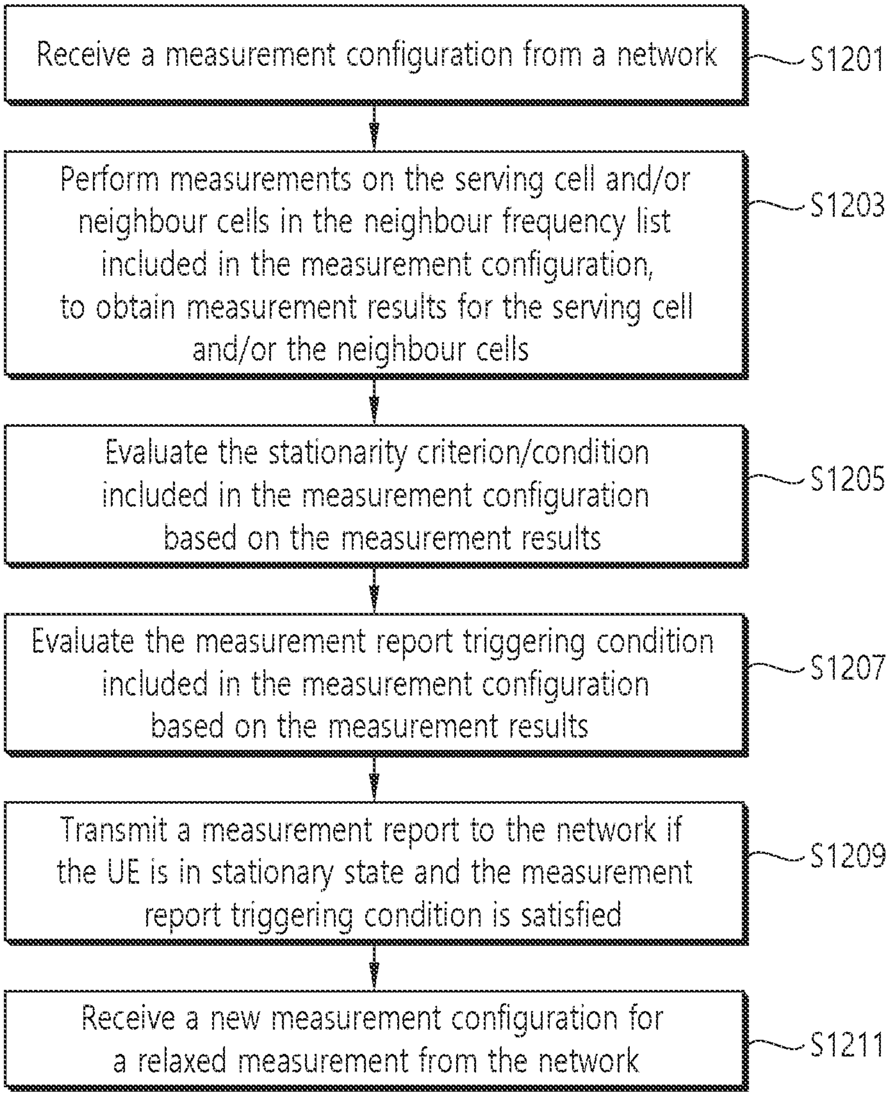
FIG. 12 shows an example of a method for a measurement reporting based on a stationarity criterion according to an embodiment of the present disclosure.

FIG. 12 shows an example of a method for a measurement reporting based on a stationarity criterion according to an embodiment of the present disclosure. The method may be performed by a UE and/or a wireless device.

Referring to FIG. 12, in step S1201, the UE may receive a measurement configuration from a network (e.g., serving cell).

In some implementations, the UE may be in RRC_IDLE, RRC_INACTIVE, or RRC_CONNECTED.

In some implementations, the measurement configuration may include a stationarity criterion.

For example, the stationarity criterion may be based on a change of a measured cell quality of a cell. If a change of measured cell quality of the cell is smaller than a configured threshold for a configured time period, it may be considered that the UE fulfils the stationarity criterion.

For example, the stationarity criterion may be "relaxed measurement criterion for UE with low mobility" in Relaxed measurements. If the UE fulfils the "relaxed measurement criterion for UE with low mobility", it may be considered that the UE fulfils the stationarity criterion.

If the UE fulfils the stationarity criterion, the UE may be in a stationary state.

In some implementations, the measurement configuration may include a neighbour frequency list. The UE may perform measurements on neighbour frequencies in the neighbour frequency list, to obtain measurement results for the neighbour frequencies. Based on the measurement results, the UE may perform a mobility (e.g., handover).

In some implementations, the measurement configuration may include a reporting frequency list. The UE may perform measurements on the reporting frequency list. The UE may report the measurement results of the cells in the reporting frequency list when UE is in RRC_CONNECTED. For example, the reporting frequency list may be equal to the neighbour frequency list. For another example, the reporting frequency list may be a subset of the neighbour frequency list.

In some implementations, the measurement configuration may include a measurement report triggering condition (i.e., cell quality condition). The measurement report triggering condition may comprise at least one of:

"Event A1 (Serving becomes better than threshold)";

"Event A2 (Serving becomes worse than threshold)";

"Event A3 (Neighbour becomes offset better than SpCell)";

"Event A4 (Neighbour becomes better than threshold)";

"Event A5 (SpCell becomes worse than threshold1 and neighbour becomes better than threshold2)";

"Event A6 (Neighbour becomes offset better than SCell)";

"Neighbour becomes worse than threshold". If measured cell quality of neighbour cell is lower than threshold, the measurement report triggering condition may be satisfied;

"Neighbour becomes better than threshold". If measured cell quality of neighbour cell is higher than threshold, the measurement report triggering condition may be satisfied; or "SpCell becomes better than threshold1 and neighbour becomes worse than threshold2". If measured cell quality of the SpCell is higher than the threshold1 and measured cell quality of the neighbour cell is lower than the threshold2, the measurement report triggering condition may be satisfied.

In the above measurement report triggering condition(s), the neighbour may be the highest ranked cell of the corresponding frequency.

In some implementations, each measurement report triggering condition in the measurement configuration may be combined with the stationarity criterion. That is, the UE may trigger a measurement report if the UE satisfies the configured measurement report triggering condition and also the UE is in a stationary state based on the stationarity criterion.

In some implementations, each measurement report triggering condition may indicate which cell's measurement results to be included in the measurement report. When the UE triggers a measurement report based on the measurement report triggering condition, the UE may include measurement results of the indicated cell in the measurement report.

For example, the indicated cell may be in a member of the reporting frequency list.

For example, the indicated cell may be the highest ranked cell of the corresponding frequency.

For example, the indicated cell may be one or more cells in the cell list in the corresponding frequency.

In some implementations, the measurement configuration may indicate whether the UE triggers a measurement report only when both the cell quality condition and the stationarity condition are satisfied. The indication may be indicated per measurement report configuration or per measurement ID. For instance, if the indication is configured for an associated event, the UE may trigger a measurement report if the event is met and the stationarity condition is also met.

In step S1203, the UE may perform measurements on the serving cell and/or neighbour cells in the neighbour frequency list included in the measurement configuration, to obtain measurement results for the serving cell and/or the neighbour cells. The quantity of the measurement results may be RSRP/RSRQ.

In step S1205, based on the measurement results obtained in step S1203, the UE may evaluate the stationarity criterion/condition included in the measurement configuration. The UE may select a reference cell. The reference cell may be a serving cell, PCell, PSCell, and/or a neighbor cell in the neighbor frequency list. If the selected reference cell fulfils the stationarity criterion, the UE may be in a stationary state.

In step S1207, if the UE is in a stationary state based on the stationarity criterion evaluation in step S1205, the UE may evaluate the measurement report triggering condition included in the measurement configuration.

In step S1209, if the UE is in stationary state and the configured measurement report triggering condition is satisfied, the UE may transmit a measurement report to the network. The measurement report may include measurement results of indicated cells indicated by the measurement report triggering condition.

in step S1211, when the network receives the measurement report, the network may provide a new measurement configuration to the UE and the UE may receive the new measurement configuration from the network. If the measurement report indicates that certain cell's measured cell quality is low (e.g., lower than a threshold configured by the network), then the network may provide a relaxed measurement configuration for the cell or the corresponding frequency in the new measurement configuration.

According to various embodiments of the present disclosure, UE may trigger a measurement report when the configured measurement report triggering condition is satisfied and also the UE is in a stationary state. The measurement report may indicate which cell's measurement result is not good. Based on the measurement report triggered in the stationary state, the network may refer to the measurement report for providing anew measurement configuration. By providing the new measurement configuration, the network may enable RRM relaxation. The new measurement configuration may relax the measurement on the cells with not good cell quality. By measurement relaxation, the UE can save power consumption by performing a relaxed measurement on the cells with not good cell quality.

According to various embodiments of the present disclosure, UE may transmit a measurement report message including measurement results of cells and/or a mobility state of the UE. The mobility state of the UE may indicate whether the UE is in a stationary state or not, or whether the UE enters a stationary state or leaves a stationary state, or whether the UE is in high-speed condition or a certain mobility condition.

For example, if UE enters a stationary state by satisfying a stationarity condition (as defined above) or if UE enters a non-stationary state by unsatisfying the stationarity condition that has been satisfied, the UE may construct a message (e.g., measurement report) that includes a mobility state of the UE (e.g., stationarity or non-stationarity) and a measurement result of at least one cell (e.g., serving cell(s) and/or neighbour cell(s)) and send the message to the network. The message may include measurement results of N best cells for each frequency for which measurement object is configured, where N is configurable or pre-defined. Upon receiving the message, the network may determine frequencies for which measurement relaxation can be applicable and/or for which frequencies measurement relaxation needs to be avoided.

For example, suppose six frequencies are configured for neighbour cell measurement. If four of the six frequencies have highest ranked cell whose cell quality is higher than a configured cell quality threshold, the four frequencies and/or at least one neighbour cell on the four frequencies can be considered as being under a good radio condition. In this case, even if a serving cell quality satisfies a measurement relaxation condition (i.e., stationarity condition), the UE may not perform a measurement relaxation on the four frequencies, for example by receiving a configuration for enabling the UE to perform a relaxed measurement on the remaining two frequencies and/or cells on the remaining two frequencies.

Figure 13:
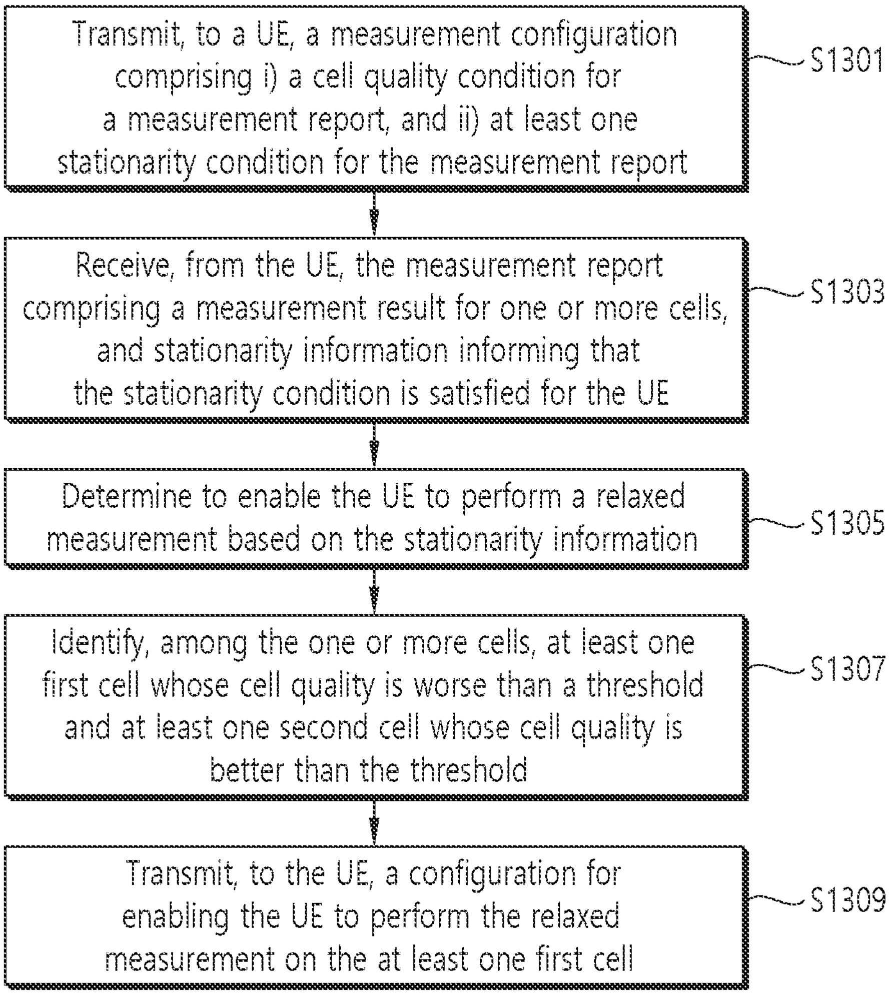
FIG. 13 shows an example of a method performed by a BS according to an embodiment of the present disclosure.

FIG. 13 shows an example of a method performed by a BS according to an embodiment of the present disclosure.

Referring to FIG. 13, in step S1301, the BS may transmit, to a UE, a measurement configuration comprising i) a cell quality condition for a measurement report, and ii) at least one stationarity condition for the measurement report.

In step S1303, the BS may receive, from the UE, the measurement report comprising a measurement result for one or more cells, and stationarity information informing that the stationarity condition is satisfied for the UE.

In step S1305, the BS may determine to enable the UE to perform a relaxed measurement based on the stationarity information.

In step S1307, the BS may identify, among the one or more cells, at least one first cell whose cell quality is worse than a threshold and at least one second cell whose cell quality is better than the threshold.

In step S1309, the BS may transmit, to the UE, a configuration for enabling the UE to perform the relaxed measurement on the at least one first cell.

In the disclosure, the method in perspective of the UE described above in FIG. 12 may be performed by first wireless device 100 shown in FIG. 2, the wireless device 100 shown in FIG. 3, the first wireless device 100 shown in FIG. 4 and/or the UE 100 shown in FIG. 5.

More specifically, the UE may comprise at least one transceiver, at least processor, and at least one computer memory operably connectable to the at least one processor and storing instructions that, based on being executed by the at least one processor, perform operations.

The operations comprise: receiving, from a serving cell, a measurement configuration comprising i) a cell quality condition for a measurement report, and ii) at least one stationarity condition for the measurement report; performing a measurement on one or more cells based on the measurement configuration, to obtain a measurement result for the one or more cells; and transmitting, to the serving cell, the measurement report based on that i) the measurement result for the one or more cells satisfies the cell quality condition, and ii) the at least one stationarity condition is satisfied for the UE. The measurement report may comprise the measurement result for the one or more cells, and stationarity information informing that the at least one stationarity condition is satisfied for the UE.

In the disclosure, the method in perspective of the UE described above in FIG. 12 may be performed by a software code 105 stored in the memory 104 included in the first wireless device 100 shown in FIG. 4.

More specifically, at least one computer readable medium (CRM) stores instructions that, based on being executed by at least one processor, perform operations comprising: receiving, from a serving cell, a measurement configuration comprising i) a cell quality condition for a measurement report, and ii) at least one stationarity condition for the measurement report; performing a measurement on one or more cells based on the measurement configuration, to obtain a measurement result for the one or more cells; and transmitting, to the serving cell, the measurement report based on that i) the measurement result for the one or more cells satisfies the cell quality condition, and ii) the at least one stationarity condition is satisfied for the UE. The measurement report may comprise the measurement result for the one or more cells, and stationarity information informing that the at least one stationarity condition is satisfied for the UE.

In the disclosure, the method in perspective of the UE described above in FIG. 12 may be performed by control of the processor 102 included in the first wireless device 100 shown in FIG. 2, by control of the communication unit 110 and/or the control unit 120 included in the wireless device 100 shown in FIG. 3, by control of the processor 102 included in the first wireless device 100 shown in FIG. 4 and/or by control of the processor 102 included in the UE 100 shown in FIG. 5.

More specifically, an apparatus for configured to operate in a wireless communication system (e.g., wireless device) comprises at least processor, and at least one computer memory operably connectable to the at least one processor. The at least one processor is configured to perform operations comprising: receiving, from a serving cell, a measurement configuration comprising i) a cell quality condition for a measurement report, and ii) at least one stationarity condition for the measurement report; performing a measurement on one or more cells based on the measurement configuration, to obtain a measurement result for the one or more cells; and transmitting, to the serving cell, the measurement report based on that i) the measurement result for the one or more cells satisfies the cell quality condition, and ii) the at least one stationarity condition is satisfied for the UE. The measurement report may comprise the measurement result for the one or more cells, and stationarity information informing that the at least one stationarity condition is satisfied for the UE.

The present disclosure may be applied in perspective of a network node (e.g., base station (BS)) configured to operate in a wireless communication system. The method performed by the network node/BS comprises: transmitting, to a user equipment (UE), a measurement configuration comprising i) a cell quality condition for a measurement report, and ii) at least one stationarity condition for the measurement report; receiving, from the UE, the measurement report comprising a measurement result for one or more cells, and stationarity information informing that the stationarity condition is satisfied for the UE; determining to enable the UE to perform a relaxed measurement based on the stationarity information; identifying, among the one or more cells, at least one-first cell whose cell quality is worse than a threshold and at least one second cell whose cell quality is better than the threshold; and transmitting, to the UE, a configuration for enabling the UE to perform the relaxed measurement on the at least one first cell.

In the disclosure, the method in perspective of the network node described above may be performed by second wireless device 100 shown in FIG. 2, the device 100 shown in FIG. 3, and/or the second wireless device 200 shown in FIG. 4.

More specifically, the network node comprises at least one transceiver, at least processor, and at least one computer memory operably connectable to the at least one processor and storing instructions that, based on being executed by the at least one processor, perform operations.

The operations comprise: transmitting, to a user equipment (UE), a measurement configuration comprising i) a cell quality condition for a measurement report, and ii) at least one stationarity condition for the measurement report; receiving, from the UE, the measurement report comprising a measurement result for one or more cells, and stationarity information informing that the stationarity condition is satisfied for the UE; determining to enable the UE to perform a relaxed measurement based on the stationarity information; identifying, among the one or more cells, at least one first cell whose cell quality is worse than a threshold and at least one second cell whose cell quality is better than the threshold; and transmitting, to the UE, a configuration for enabling the UE to perform the relaxed measurement on the at least one first cell.

The present disclosure can have various advantageous effects.

For example, the UE may be enabled by the network to perform a relaxed measurement after informing to the network that the UE is in a stationary state, and to perform the relaxed measurement on cells with not good cell quality determined by the measurement report from the UE. Therefore, the UE can save power and power consumption by the UE can be reduced.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

The invention claimed is:

1. A method comprising:

receiving, by a user equipment (UE) from a serving cell, a measurement configuration, wherein the measurement configuration comprises a measurement report triggering condition related to a cell quality for a measurement report, wherein the measurement configuration further comprises a stationarity condition for the measurement report;

wherein the stationarity condition corresponds to a relaxed measurement condition for a stationary UE, and wherein the relaxed measurement condition for the stationary UE is fulfilled based on a variation in the cell quality of the serving cell being smaller than a threshold for a time period;

performing, by the UE, a measurement on one or more cells based on the measurement configuration;

evaluating, by the UE, the stationarity condition;

evaluating, by the UE, the measurement report triggering condition based on the stationarity condition being satisfied; and transmitting, by the UE to the serving cell, the measurement report based on the measurement report triggering condition being satisfied, wherein the measurement report comprises a result of the measurement on the one or more cells, and stationarity information informing that the stationarity condition is satisfied for the UE.

2. The method of claim 1, wherein the result of the measurement comprises at least one of the cell quality of the serving cell or a cell quality of at least one neighbour cell.

3. The method of claim 2, wherein the measurement report triggering condition comprises at least one of:

event A1 condition that the cell quality of the serving cell becomes better than a threshold during at least a period of time-to-trigger (TTT);

event A2 condition that the cell quality of the serving cell becomes worse than a threshold during at least a period of TTT;

event A3 condition that the cell quality of the at least one neighbour cell becomes better than that of the serving cell by an offset during at least a period of TTT;

event A4 condition that the cell quality of the at least one neighbour cell becomes better than a threshold during at least a period of TTT; or event A5 condition that the cell quality of the serving cell becomes worse than a serving cell threshold and the cell quality of the at least one neighbour cell becomes better than a neighbour cell threshold, during at least a period of TTT.

4. The method of claim 1, wherein the one or more cells comprise at least one first cell whose cell quality is worse than a threshold and at least one second cell whose cell quality is better than the threshold, and wherein the method further comprises:

receiving, from the serving cell, a configuration for enabling the UE to perform a relaxed measurement on the at least one first cell after transmitting the stationarity information to the serving cell; and performing the relaxed measurement on the at least one first cell based on the configuration.

5. The method of claim 4, wherein the performing of the relaxed measurement comprises skipping a measurement on the at least one first cell.

6. The method of claim 5, wherein the configuration comprises one or more measurement target cells including the at least one second cell and excluding the at least one first cell.

7. The method of claim 4, further comprising:

performing a normal measurement on the at least one second cell based on the configuration.

8. The method of claim 7, wherein the performing of the relaxed measurement comprises performing a measurement on the at least one first cell based on a relaxed measurement period longer than a normal measurement period required for the normal measurement.

9. The method of claim 8, wherein the configuration comprises the relaxed measurement period for a measurement on the at least one first cell, and the normal measurement period for a measurement on the at least one second cell.

10. The method of claim 1, wherein the UE is in communication with at least one of a mobile device, a network, or autonomous vehicles other than the UE.

11. A user equipment (UE) comprising:

at least one transceiver;

at least one processor; and at least one computer memory operably connectable to the at least one processor and storing instructions that, based on being executed by the at least one processor, cause the UE to perform operations comprising:

receiving, from a serving cell, a measurement configuration, wherein the measurement configuration comprises a measurement report triggering condition related to a cell quality for a measurement report, wherein the measurement configuration further comprises a stationarity condition for the measurement report;

wherein the stationarity condition corresponds to a relaxed measurement condition for a stationary UE, and wherein the relaxed measurement condition for the stationary UE is fulfilled based on a variation in the cell quality of the serving cell being smaller than a threshold for a time period;

performing a measurement on one or more cells based on the measurement configuration;

evaluating the stationarity condition;

evaluating the measurement report triggering condition based on the stationarity condition being satisfied; and transmitting, to the serving cell, the measurement report based on the measurement report triggering condition being satisfied, wherein the measurement report comprises a result of the measurement on the one or more cells, and stationarity information informing that the stationarity condition is satisfied for the UE.

* * * * *